Jan. 1, 1952                T. C. MAIN                2,581,118
METHOD OF CONTROLLING TEMPERATURES IN A FLUIDIZED
CATALYST HYDROCARBON SYNTHESIS PROCESS
Filed May 9, 1947
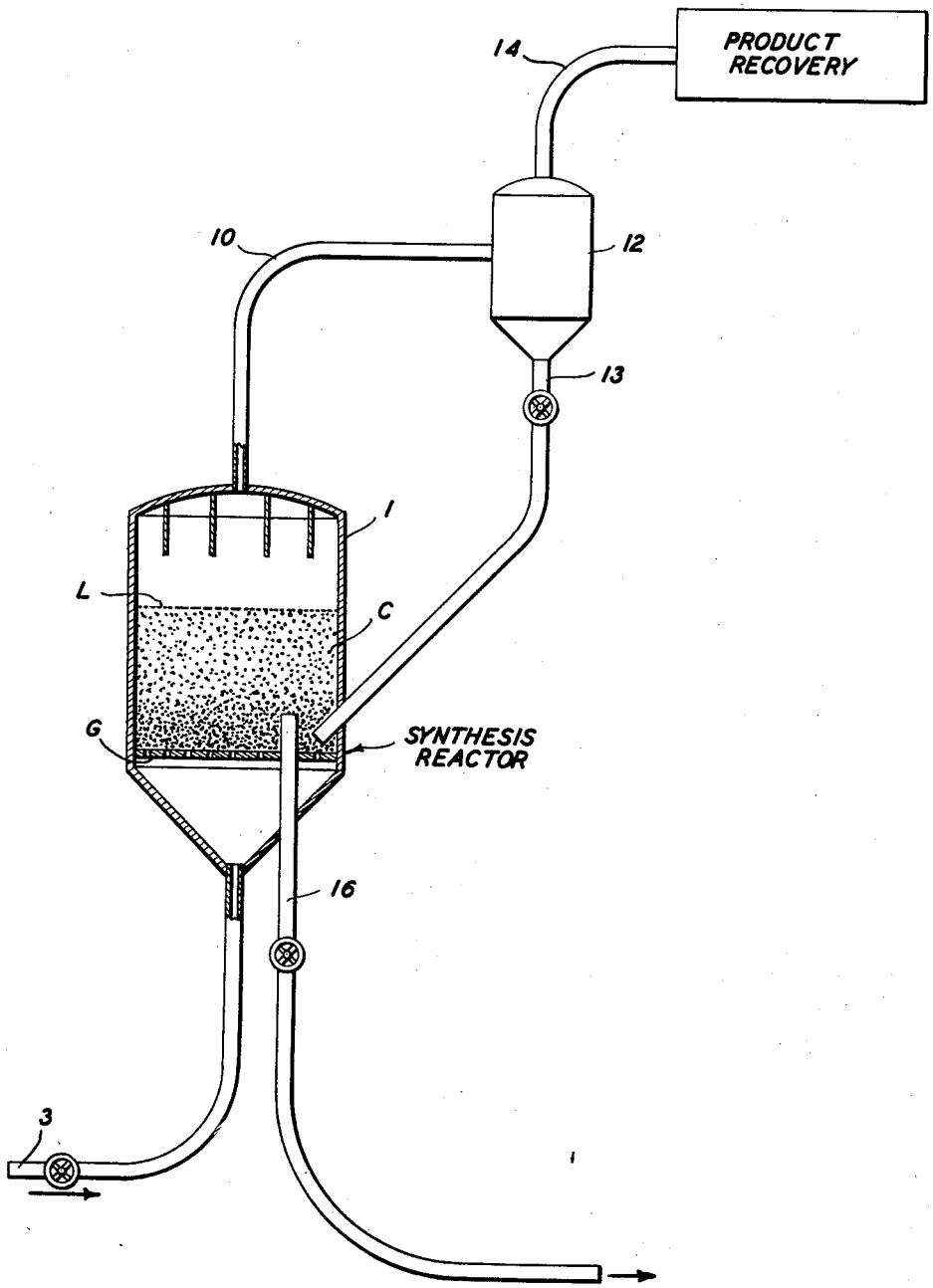
INVENTOR
THOMAS C. MAIN
BY
ATTORNEY Patented Jan. 1, 1952

2,581,118

UNITED STATES PATENT OFFICE 2,581,118

METHOD OF CONTROLLING TEMPERATURES IN A FLUIDIZED CATALYST HYDROCARBON SYNTHESIS PROCESS

Thomas C. Main, Beaumont, Tex., assignor to Standard Oil Development Company, a corporation of Delaware Application May 9, 1947, Serial No. 747,110

4 Claims. (Cl. 260—449.6)

My present invention relates to improvements in the fluidized solid type of chemical vapor phase process. The novel features of my invention are fully disclosed in the following specification, the drawing forming a part thereof, and the claims.

The fluid catalyst technique has now been developed sufficiently so that those engineers experienced in the petroleum and other chemical arts know its mode of operation. In general, in this process, within a reactor, there is provided a dense supension of powdered catalyst in a gaseous or vaporous material charged thereto. This phenomenon is effected by controlling the upward velocity of the gaseous and vaporous reactants within certain limits, responsive to the particle size of the catalyst, whereby the said dense, turbulent suspension of catalyst in the gasiform material is achieved. Numerous commercial continuous catalytic cracking plants are now in operation in this country employing the fluid catalyst type of process. Hence, as stated, the industry is by now well acquainted with them and the manner in which they operate.

The present invention has to do with control of reactions such as in the synthesis of hydrocarbons, an operation entirely different, of course, from that of catalytic cracking in that the former is highly exothermic and presents its own special problems. Thus, in a commercial plant in which 137,000,000 standard cubic feet of gas (containing about 125,000,000 cubic feet of $CO+H_2$, the remainder $CO_2$, $CH_4$, $N_2$, etc.) are fed to the reaction zones per stream day, from 300,000,000 to 350,000,000 B. t. u.'s are released per hour during the hydrocarbon synthesis reaction. In view of the large amount of heat thus liberated, it is difficult, as the process is ordinarily operated, to maintain a uniform temperature throughout the reaction zone. Since the concentration of the reactants will be highest in the bottom of the reactor (where the reactants enter) the highest temperatures are apt to exist at the bottom of the reactor.

It is an object of the present invention, therefore, to improve vapor phase chemical reactions performed in the presence of a fluidized powdered catalyst, by effecting control of the reaction, and in particular temperature control, in a manner which is more expeditious and cheaper than any heretofore proposed.

Another object of the present invention is to maintain within the reaction zone of a highly exothermic vapor phase chemical process employing a fluidized catalyst, a substantially uniform temperature.

Still another object of the present invention is to maintain within the reaction zone of a highly exothermic vapor phase chemical process employing a fluidized catalyst, a lower temperature in the bottom of the reaction zone than that prevailing further up.

In the accompanying drawing, I have shown diagrammatically an apparatus layout in which a preferred modification of my invention may be carried into practical effect.

While my improvements are of general application, I shall describe in detail an embodiment of my invention by reference to its application in the synthesis of hydrocarbons and oxygenated hydrocarbons by reacting together carbon monoxide and hydrogen.

Referring in detail to the drawing, I represents a vertical shell type reactor consisting essentially of a cylindrical shell having a conical base and a convex crownpiece and provided near the bottom of the cylindrical portion with a grid or screen G. The feed gas, containing a mixture of carbon monoxide and hydrogen properly proportioned according to known procedure, enters the system through line 3 and is thereafter discharged into the bottom of reactor I and passes upwardly through the grid member G into the main body of catalyst C, which is present in the reactor in the form of a dense, turbulent suspension. The catalyst consists of a physical mixture of an active component and a diluent, and is so maintained within the reactor that the entering gases first contact the lower portion of the body of fluidized catalyst, the mixture of which active catalyst and inert diluent is richer in the latter component than the mixture further up near the top of the bed, all of which will be described more fully hereinafter. The reaction gases pass through the fluidized bed of catalyst at synthesis temperatures and pressures and contact the catalyst under these conditions for a sufficient period of time to effect the desired conversion. Such operating conditions are well known to those familiar with the art, and since my present improvements do not go to this matter of operating conditions such as temperature, pressure, and residence time, it will not be necessary for me to give a detailed statement of such conditions. The reaction vapors or gases emerge from the bed of fluidized catalyst, that is to say, from the dense bed of fluidized catalyst, the upper limit of which is at some point L, and thence pass toward the top of the reactor. Above the dense phase level L in the reactor there is a dilute phase suspension of catalyst in gases or vapors. The position of the upper dense phase level L is fixed by the amount of catalyst, that is to say, the number of pounds of catalyst charged to the reaction zone and, of course, the velocity of the gases passing upwardly therethrough. The gases or vapors, before leaving the reactor, pass through a plurality of gas-solids contacting devices commonly referred to as "cyclone" separators, in which separators fine catalyst or entrained coarse catalyst is removed, and the gases finally emerge overhead through a line 1. However, the gases ordinarily still contain minor amounts of catalyst, and in order to further remove the catalyst from the gases, they are forced through one or more dust separators 12 (usually of the electrical precipitating type) and the catalyst thus removed is returned to the reactor via line 13 while the gases, now substantially freed of catalyst, pass via line 14 into a product recovery system which need not be described in detail herein. It will be sufficient to say that the crude product is subjected to fractional distillation and other known refining methods to recover desired products such as gas oil, gasoline, and the like.

Referring again to the reaction zone, the same is usually provided with a drawoff pipe 16 through which catalyst may be at least periodically withdrawn for the purpose of cooling the catalyst if that becomes necessary and then returning the catalyst to the reaction zone in cooled condition. Also, it may be necessary to remove catalyst for the purpose of regenerating the same.

Since my improvements are centered in the reaction zone itself and the manner in which it is operated, for purposes of simplicity I have limited the showings in the drawing to those which are necessary to illustrate my present invention. It will be obvious to those familiar with this type of operation that numerous engineering aids and accessory apparatus, (not shown) including pumps, flow control and measuring devices, preheaters, heat exchangers, and the like would be included in the final commercial unit for the purpose of operating the said unit in an expeditious and commercially feasible method.

As I have previously stated, catalyst C, which is present in the form of a dense, turbulent suspension in the reaction zone, consists of a mechanical mixture of an active component and diluent. The active component and the diluent are of different particle size and, due to the difference in particle size there will be a tendency, due to classification and/or elutriation, for the finer particles of the active component to concentrate in the upper portions of the bed, with the result that the inert solid particles in the dense suspension will be more concentrated in the lower portion of the bed. The result of the difference in the relative amounts of inert and active catalyst in the fluid mass is to tend to equalize the temperature throughout the fluid mass or dense suspension of catalyst by distributing the conversion of CO throughout the length of the bed. Without the diluent there is evidence to support the conclusion that in an ordinary fluidized bed of powdered catalyst, the conversion of CO (which is converted more rapidly than the $H_2$) is complete in the first quarter of the bed. By diluting the active catalyst with inert material in the lower portion of the bed, the reaction is throttled or delayed in this region, thus effecting an improvement in the over-all smoothness of the operation, with the attendant desirable attributes of uniformity of temperature throughout the entire fluidized bed and a more nearly equal rate of CO and $H_2$ consumption. Fresh synthesis gas then entering the reactor first contacts a mass of solids and diluent which does not possess the active catalyzing capabilities of portions of the catalyst mixture higher up in the dense suspension, with the result that the extent of the conversion in the lower portion of the fluid bed or suspension is retarded or limited and with it the amount of heat released. As the reactants proceed upwardly in the bed, they encounter progressively more active catalyst, that is to say, a mixture of solids in which the percentage composition of the active ingredient is increased. This greater concentration of finer active component is at a maximum near the top of the dense suspension of catalyst, in other words, in the region approaching L in the drawing.

For example, in a fluid catalyst reactor having a ratio of length to diameter of about 4.8, two portions of silica gel having different particle sizes were mixed. The finer of the two portions (60 weight per cent) passed 100 per cent through a 325 mesh screen, while the coarse material (40 weight per cent) passed through an 80-mesh screen but was retained on a 100-mesh screen. Air was passed through the mixture at a velocity sufficient to cause good fluidization of the mass. The superficial velocity was about 0.74 feet per second. After equilibrium had been established which was in about an hour, samples were taken from the bottom and the top of the fluidized catalyst bed. The sample at the bottom contained only 23 per cent of the material passing through the 325 mesh screen—greatest diameter about 40 microns. The sample taken from the top of the bed contained 59 per cent smaller than 325 mesh.

When a similar test was made using a mixture of coarse (80 to 100 mesh) iron powder (60 weight per cent) and a fine 325 size silica gel, (40 weight per cent) a similar segregation resulted. In this test a sample withdrawn from near the bottom of the bed contained 44 per cent fines and a sample withdrawn at the top of the bed contained 77 per cent fines. Air was the fluidizing gas. The superficial air velocity was 0.740 feet per second.

From the above tests it can be seen that the size of the particle has more effect on the extent of the segregation than does the density of the particle, and the segregation with a mixture of two different sized silica gels was as great as the segregation obtained using dense iron powder and relatively light silica gel. The second example shows the advantage of using a coarse material as a diluent and a fine material as the active ingredient of the fluidized bed.

In studies made with cobalt catalyst and silica gel mixtures, it was found that the coarser particles tended to become concentrated in the lower portion of a fluidized bed. In these runs, air was used as the fluidizing gas. In one of these runs, silica gel having a particle size of 100–200 mesh was mixed with the cobalt catalyst in the proportion of 25 weight per cent silica gel and 75 weight per cent of the cobalt catalyst at a superficial air velocity of 0.640 feet per second. Where the vessel containing the fluidized bed was 3.7 times as high as its diameter, the concentration in particles having a size greater than 40 microns changed from 89%, at a point 6 inches from the bottom, to 83%, at a point 12 inches from the bottom. It should be pointed out that the cobalt catalyst had the following particle size distribution:

Weight percent of 0–20 microns _____ 23
Weight percent of 20–40 microns _____ 16.5
Weight percent of 40–80 microns _____ 27.3
Weight percent of 80+ microns _____ 32.8

By increasing the superficial gas velocity to 0.730 feet per second, a greater degree of segregation is obtained, that is to say, at a point 6 inches from the bottom of the bed, 92% of the solids had a size greater than 40 microns, whereas at a point 12 inches from the bottom of the bed, the particles having a size greater than 40 microns dropped to 83%. This is a drop of about 9%.

In a further test, powdered iron was mixed with powdered silica gel in about equal quantities by weight, the two materials having about the same particle size distribution, in other words, ground so that each was composed of about the same weight per cent of particles of the same sizes. When fluidized with a gas, at equilibrium, there was no substantial segregation or concentration of either material at any level in the bed.

In general, it may be stated that in order to provide segregation between an active catalyst and its diluent should have at least two or three times the average particle size of the catalyst if it is desired to concentrate the diluent in the lower portion of the bed. If, on the other hand, the reverse is desired, namely, a concentration of the catalyst in the lower portion of the bed, then of course its average particle size should be two or three times that of the diluent. In any event, where the gas velocity is at least 0.3 to 0.4 feet per second, I may control concentration of either the diluent or the active catalyst at any desired level in the bed, and within reasonable limits, by varying the relative particle size distribution of the two materials by varying the relative average particle sizes of the two materials.

As regards the foregoing examples, it is to be understood that the same are purely illustrative of my invention and that any inert material other than silica gel such as various clays, pumice, sand, etc., may be used with iron or other active components such as cobalt, copper, the oxides of heavy metals, etc., so long as the active component has a smaller particle size than the inert diluent. My experiments indicate that particle size rather than density is controlling in the segregation referred to above wherein the finer particles of the active component by elutriation or classification are more concentrated in the upper portion of the dense phase than are the coarser particles. It will be understood, of course, that depending on the catalyst and the diluent, the superficial velocity of the upflowing gases must be maintained within the fluidizing range, so called, which ordinarily is somewhere between 0.5 to 3 feet per second. It may be pointed out in this connection that my experiments indicate that classification or segregation of the finer particles in the upper portion of the dense phase is not effected to any substantial degree where the superficial velocity of the upflowing gases or vapors is of the order of 0.1 to 0.2 feet per second.

To recapitulate briefly, my present improvements involve, in particular, that concept of operating fluid catalyst processes such as the hydrocarbon synthesis employing a carbon monoxide and hydrogen mixture as feed gas and a fluidized bed of catalyst containing at least one active component and one diluent component of greater average particle size than the active component, whereby maintenance of more uniform temperatures throughout the entire bed of catalyst is accomplished by causing a greater concentration of the active component to be disposed in the upper portion of the dense suspension and a correspondingly lower concentration in the lower portion of the bed so as to cause the over-all temperatures within the mass of catalyst to be held at a substantially uniform desired level, so that undesirable "hot spots" or "runaway" temperatures are avoided. As previously indicated, it is also within the scope of my invention to provide a sufficient concentration of the coarse, inert material at the bottom of the reaction zone or dense, turbulent bed so that a lower temperature prevails in the said lower portion of the bed than exists at points higher up.

Numerous modifications of my invention will be apparent to those who are familiar with the art without departing from the spirit thereof.

What I claim is:

1. A continuous method for synthesizing hydrocarbons which comprises forcing a mixture of carbon monoxide and hydrogen upwardly through a reaction zone charged with a mixture of solid active synthesis catalyst particles and solid diluent particles in fluidized condition in said reaction zone and maintained under synthesis conditions of temperature and pressure, said solid active synthesis catalyst particles being of relatively high specific gravity and of small, fluidizable particle size, said diluent particles having a lower specific gravity than the catalyst particles and having a particle size at least 2 to 3 times the average particle size of the catalyst particles, maintaining said mixture of catalyst particles and solid diluent particles as a dense fluidized bed in the reaction zone with the active catalyst particles disposed in more concentrated form in the upper portion of the dense fluidized bed and the solid diluent particles disposed in more concentrated form in the lower portion of said bed by regulating the superficial velocity of the upflowing gases within the limits of 0.5 to 3.0 ft. per second, thereby equalizing temperature conditions in the dense bed by suppressing the reaction in the lower portion of the bed and removing a crude synthesis product from the upper portion of said reaction zone.

2. The method set forth in claim 1 in which the active catalyst component is powdered iron and the diluent component is silica gel.

3. The process as defined in claim 1 wherein the active catalyst particles pass completely through a 325 mesh sieve while the solid diluent particles pass an 80 mesh sieve but are retained by a 100 mesh sieve.

4. The method set forth in claim 3 in which the active catalyst component is powdered iron and the diluent component is silica gel.

THOMAS C. MAIN.

REFERENCES CITED

The following references are of record in the file of this patent:

UNITED STATES PATENTS

| Number | Name | Date |
| --- | --- | --- |
| 2,393,240 | Dreyfus | Jan. 22, 1946 |
| 2,393,909 | Johnson | Jan. 29, 1946 |
| 2,399,050 | Martin | Apr. 23, 1946 |
| 2,459,444 | Main | Jan. 18, 1949 |